May 4, 1937. G. E. HOWARD 2,079,555

METHOD OF AND APPARATUS FOR MAKING GLASS

Filed Nov. 23, 1935 3 Sheets-Sheet 3

Witness;
W. B. Thayer

Inventor;
George E. Howard
by Brown & Parham
Attorneys

Patented May 4, 1937

2,079,555

UNITED STATES PATENT OFFICE 2,079,555

METHOD OF AND APPARATUS FOR MAKING GLASS

George E. Howard, Butler, Pa., assignor to Hartford-Empire Company, Hartford, Conn., a corporation of Delaware Application November 23, 1935, Serial No. 51,253

8 Claims. (Cl. 49—54)

This invention relates to a method of and apparatus for the making of glass in a glass making tank and more particularly to such a method and apparatus including the diverting of a portion of the combustion gases from the main stream passing through the tank, and passing such diverted gases over the incoming glass making materials or batch to frit over and partially melt these materials, and thereafter passing these diverted gases away from the tank to some suitable discharge point in a path which by-passes or is separate and distinct from the path of the main body of gases including the heat recovery system usually associated with glass melting tanks.

It has been found that a certain amount of the products of combustion can be diverted from the usual path of travel of such gases without reducing to any material extent the efficiency of the heat recovery system, due to the fact that the volume of the products of combustion is materially greater than that of the incoming combustion-supporting air when these gases are considered at the same conditions of temperature and pressure. A portion of the excess of the products of combustion over and above that necessary to heat the incoming air to the temperature which can be attained thereby, considering the temperature of the outgoing gases, may advantageously be used for other purposes.

One of the objects of my invention is to utilize as much as possible of the heat of these diverted gases in fritting over and partially melting the incoming glass making materials or batch.

A difficulty which is prevalent in glass making tanks including heat recovery systems, is that in the prior art tanks some of the gases pass over the incoming glass making materials and pick up a certain amount of solid material therefrom in the form of fine powder or dust, which is mechanically carried in suspension in the current of gas passing from the tank. This material thus picked up contains a high percentage of alkalies, which are extremely corrosive to the heat recovery structure provided, whether it be recuperators or regenerators, and which tend to flux down the refractories of which such heat recovery structures are made. This, in addition to the solid material carried by the outgoing gases in prior art tanks, has tended to clog the passages of the heat recovery system, which shortens the life thereof to a material extent.

A further object of the present invention, therefore, is to provide for the diverting of a portion of the main stream of combustion gases passing through the tank into a path which is separate and distinct from that of the main stream and which first passes across the incoming glass making materials or batch to supply heat thereto as aforesaid to frit over and partially melt such materials and also to provide that any alkali dust or other material picked up by the gases so diverted (this amount preferably being small due to the low velocity of the gases) will be carried through relatively large passages directly to a discharge point in a path distinct from that through the heat recovery system, thus preventing the clogging of the heat recovery system and the rapid destruction thereof as aforesaid.

Further and more detailed objects of the present invention include the specific means for controllably diverting a variable amount of combustion gases as aforesaid into a path distinct from the heat recovery system and preferably to the stack associated with the tank and the provision of specific means for carrying out any and all the above named objects.

Certain more detailed objects of the present invention will become apparent from a reading of the following specification and appended claims when taken in connection with the accompanying drawings, in which:

Fig. 5 is a fragmentary view in transverse vertical section of the reversing valve system taken on the line 5—5 of Fig. 2.

Figure 1:
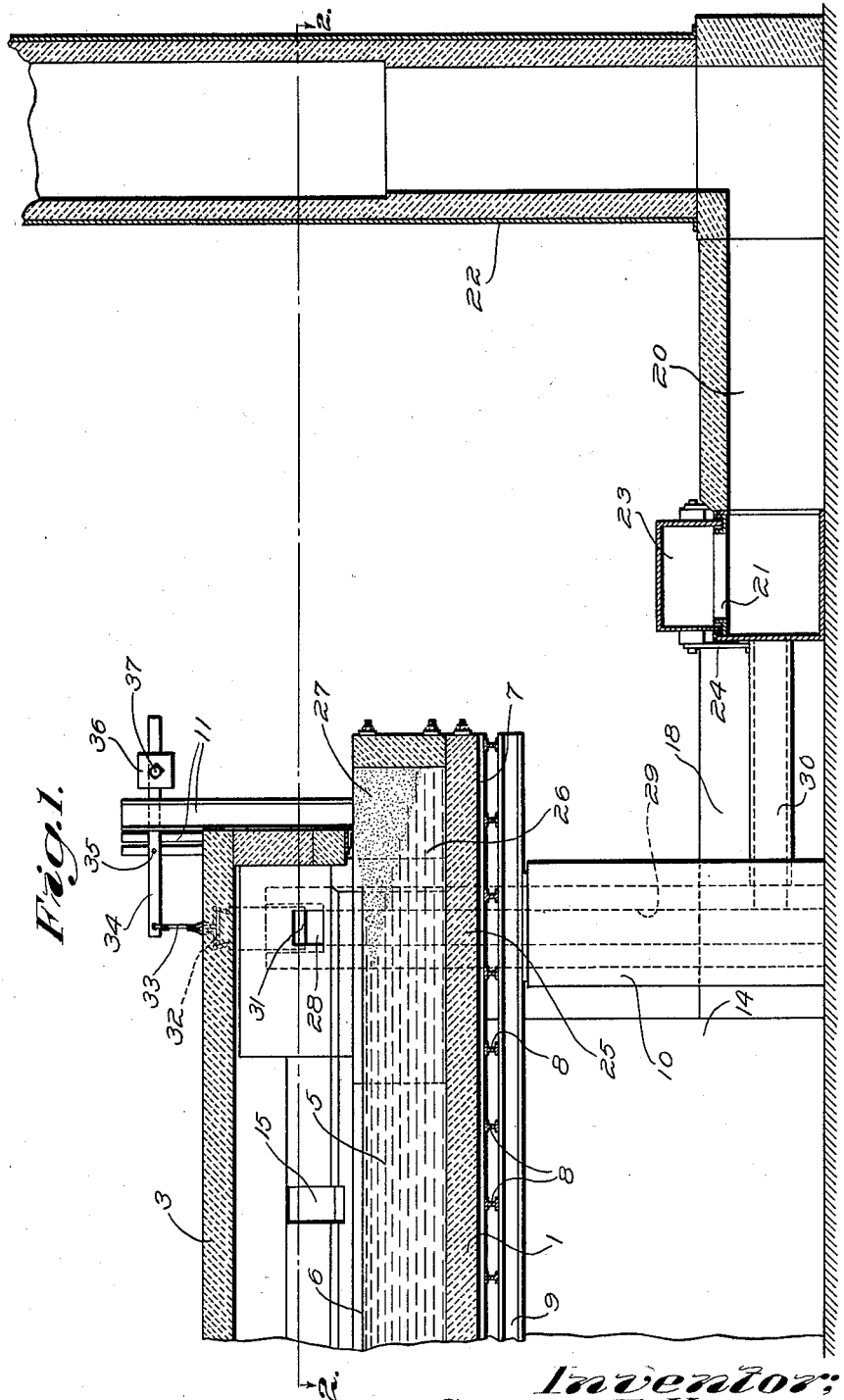
Figure 1 is a view substantially in longitudinal vertical section of the melting end portion of a glass making tank embodying my invention and showing also the means for conducting gases therefrom and the stack associated therewith.

In the accompanying drawings, I have illustrated an application of my invention to a glass melting tank, which may be substantially conventional in its construction and operation. The tank as shown comprises a glass containing basin including a bottom wall 1, sidewalls 2, a crown or roof 3, and an end wall 4. This construction is arranged to hold a bath of molten glass 5 which is normally maintained up to a predetermined level 6 in the tank.

The bottom 1 of the tank is mounted as shown upon longitudinally extending metallic members 7 which are in turn supported upon transversely extending structural members as I-beams 8 supported upon longitudinally extending beams 9 which are carried by a plurality of masonry columns 10. At the sides and ends of the tank there are provided the usual buck stays 11, which may be supported as shown (Fig. 3) from the transverse beams 8 at their lower ends and connected at their upper ends by the usual tie rods 12. Means including the thrust members 13 may be provided for supporting the lateral thrust of the side and end walls of the tank from the buck stays 11.

Means are provided for supplying heat to the tank by combustion in such manner that the gases of combustion will traverse the tank in a predetermined path. As shown in the accompanying drawings, there are provided regenerators 14, which communicate with the tank through ports 15, there being as many regenerators and ports as necessary for supplying the desired amount of heat to the tank at the desired places, as in conventional constructions. Associated with each of the ports 15, I have shown a pair of burner openings 16 into each of which is directed a burner conventionally illustrated at 17. The control of fuel to and through the burners 17 and the means for reversing the supply of fuel upon reversal of the flow through the regenerators as hereinafter set forth may be taken care of in any conventional manner (not shown).

Figure 2:
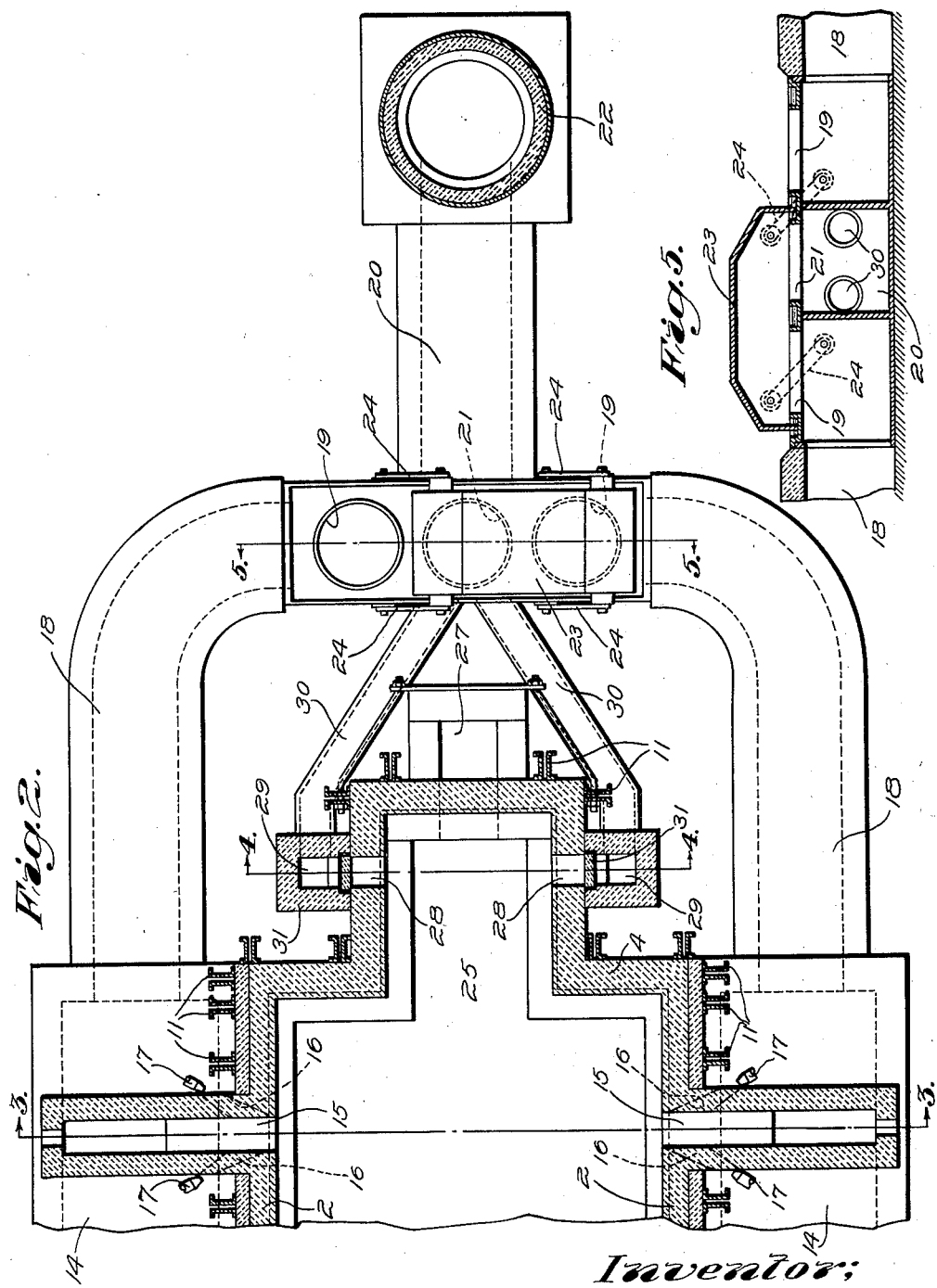
Fig. 2 is a view in horizontal section of the structure shown in Fig. 1 taken on the line 2—2 of that figure.
Figures 3, 4:
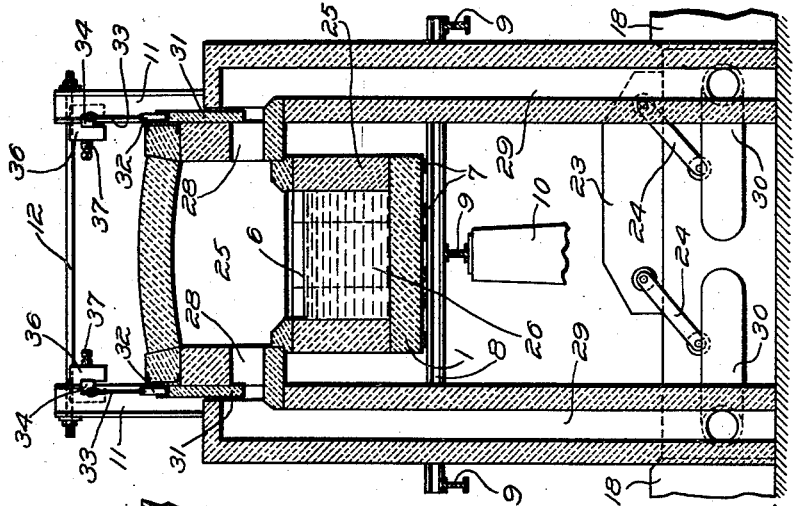
Fig. 3 is a view in transverse vertical section taken on the line 3—3 of Fig. 2, certain parts being broken away in view of the large scale on which the figure is drawn.
Fig. 4 is a view in transverse vertical section taken on the line 4—4 of Fig. 2.

Leading from the regenerators 14 are suitable flues 18, which communicate with ports 19 (Figs. 2 and 5). Intermediate the ports 19 is arranged the end of a flue 20 having an upwardly directed port 21, the flue 20 communicating in the usual manner with a stack 22. Arranged to bridge one or the other of the ports 19 and the port 21 is a hood member 23 which is pivotally mounted upon pairs of similar parallel links 24 and is arranged to be moved by some suitable operating device (not shown) between a position as shown in Fig. 5 in which it bridges the port 21 and the left hand port 19 and a position in which it bridges the port 21 and the right hand port 19 as seen in this figure. Inasmuch as this type of reversing valve system and the mechanism for operating the hood member 23, or some equivalent member, are well known in the art, no further description of this construction will be given. With the parts in the position shown, the firing of the tank will be from left to right as seen in Fig. 3, or from top to bottom as seen in Fig. 2, the air entering the right hand port 19 as seen in Fig. 5 passing through the flue 18 to the regenerator 14 at the top of the view of Fig. 2, and the exhaust gases passing out through the lowermost regenerator shown in Fig. 2 and thence through the flue 18, the port 19, beneath the hood 23, the port 21, and the flue 20 to the stack 22. The construction thus far described may be considered as substantially conventional.

At some point in the tank adjacent to the melting portion thereof and in this case centrally of the end of the tank as shown, I have illustrated a bay 25 which extends both above and below the normal level 6 of the bath of glass in the tank, so that this bay will contain a branch 26 of the bath of glass 5. While I have shown the bay 25 as substantially rectangular in horizontal contour and also of uniform depth, the same as the adjacent portion of the tank, I contemplate that the bay may be of any other desired suitable contour, as flaring in the direction toward the tank proper, and also that the bottom thereof may be sloping or stepped. Also if desired, a suitable arch may be used partially heat-separating the space over the glass in the bay from the flame space of the tank proper if this effect is desired, all without in any way departing from the spirit of my invention. At a suitable portion of this bay, as at the end thereof, there is provided means for the introduction of glass making materials or batch to the bath of glass in the bay. In this case, I have illustrated a conventional "dog house" 27 to which glass making materials or batch may be supplied, as indicated in Fig. 1, in any suitable manner, as by manual means as now in common use in the art. It will be noted that due to the fact that the glass making materials are supplied to the bath of glass in the bay 25, they will not be subjected to the sweep of the gases of the main stream which pass across the tank between the ports 15 as shown.

I provide according to my invention for the diverting of a minor and preferably variable portion of the main stream of combustion gases through the bay 25 and over the glass making materials therein to frit over and partially melt such material, this stream preferably being maintained at relatively low velocity, so as to pick up a minimum of the light powdered material, particularly alkali dust, from the batch. For this purpose, I provide one or more passages intermediate the bay 25 and some suitable discharge point, which in the present instance is a portion of the flue 20 on the down-stream side of the reversing valve system above described, including the hood 23.

As shown, I have provided two such passages which are independent each of the other and each independently controlled and which are symmetrically disposed in respect to the bay 25. The bay 25 is provided with a pair of outlet ports 28 on each side thereof which communicate with vertical flue passages 29 formed of suitable refractory material as shown, these vertical passages communicating in turn through laterally extending flues 30 with the flue 20 below the port 21.

Flow of gases through the flue passages above described from the bay 25 is controlled by dampers 31 which may be located as shown in the ports 28 or at the other suitable points in the flues. The dampers 31 may be constructed of panels of refractory material engaged by suitable clamping means 32 carried through the intermediation of links 33 from the ends of transversely extending levers 34. The levers 34 are pivoted intermediate their ends to adjacent buck stays as illustrated in Fig. 1 at 35 and are shown as provided on their arms opposite those connected to the links 33 with adjustable weights 36. The weights 36 may be secured to any desired points along the levers 34 by set screws 37. It will be understood that any suitable means including these illustrated and hereinabove described may be provided for adjusting and maintaining the adjustment of the dampers 31, or more broadly considered, for controlling the flow of gases through the one or more passages provided from the bay 25 to the exhaust point.

I have found from experience in operating tanks that the outgoing gases exceed the incoming air by a material amount, which may be in the order of magnitude of 30%. Under these circumstances, it is not required for maximum heat efficiency that all the gases produced in the tank and/or supplied thereto be passed out through the heat recovery system, which in the present instance comprises regenerators. I therefore contemplate the diversion of a portion of the main stream of gases from the tank through the bay 25 as shown and over the newly introduced glass making materials as shown in Fig. 1 in the bay. These gases thus diverted will be maintained at low velocity under control of the dampers 31 and will serve to impart a portion of their heat to the newly supplied glass making materials or batch to frit over and partially to melt such materials. I then conduct these gases away from the tank in a path or paths separate from the path of the main body of gases, or more specifically in a path by-passing the heat recovery means and preferably also the reversing valve system which may be employed with regenerators, if such means are employed. As shown, the gases pass out through one or both the ports 28, down the flues 29 and thence through the flues 30 and 29 to the stack 22.

Inasmuch as the heat of the portion of gases thus diverted would not be proportionately useful in preheating the incoming air, no material loss of heat in the incoming air will be occasioned by this diversion. Any heat recovered in preheating the glass making materials from the diverted gases will be saved to the melting process, which will increase the efficiency of the tank.

Also any solid material, such as alkali dust picked up by the diverted gases, will not be carried through the regenerators or such other heat recovery system as is associated with the tank and will increase the life of that system according as the regenerators or other heat recovery system are not fluxed down and/or clogged by the corrosive solid material. The path which this solid material takes in passing from the tank according to my invention is one using flues having relatively large cross sectional areas as regards the amount of gases passing therethrough, so that any clogging of these passages which may occur will have little or no effect upon the life of the tank as a whole, which will be increased to a certain extent in proportion as the regenerators maintain their efficiency for a greater length of time than was possible with prior art constructions.

While I have shown but one form of my invention, I contemplate that the invention may be applied in various ways which will suggest themselves to those skilled in the art, and I do not wish to be limited, therefore, except by the scope of the appended claims, which are to be construed as broadly as the state of the prior art permits.

I claim:

1. The method of making glass, which comprises the steps of establishing a bath of molten glass in a glass making tank, supplying heat to the bath by combustion in such manner that the products of combustion traverse the tank in a predetermined path, supplying glass making materials to a predetermined zone of the tank, diverting a portion of the products of combustion from the main stream flowing in the aforesaid path and passing such portion of gases over said zone and the glass making materials supplied thereto after they have been so diverted to frit over and partially melt the glass making materials, and separately removing from the tank the products of combustion thus diverted from the main stream thereof.

2. The method of making glass, which comprises the steps of establishing a bath of molten glass in a glass making tank, supplying heat to the bath by combustion in such manner that the products of combustion traverse the tank in a predetermined path, recovering a portion of the heat of the main body of the outgoing gases to preheat the air supplied to the tank for combustion, supplying glass making materials to a predetermined zone of the tank out of the path traversed by the main body of the products of combustion as aforesaid, diverting a portion of the products of combustion from the main body and passing them over said zone and over the glass making materials therein at low velocity as compared to the velocity of flow of the main body of gases in the tank, to frit over and partially melt the newly supplied glass making materials, separately removing from the tank the products of combustion thus diverted from the main stream so that they will not pass through the heat recovery system associated with the tank, and controlling the amount of gases thus diverted to leave an amount of combustion products in the main body to pass through the heat recovery system which is greater than the air supplied to the tank through the heat recovery system.

3. Apparatus for making glass, comprising a tank for containing a bath of molten glass, means for supplying heat to said tank by combustion in such manner that the products of combustion will traverse the tank in a predetermined path, means for supplying glass making materials to a zone of said tank out of said predetermined path, and means for diverting a portion of the products of combustion from the stream flowing in said path and thereafter across said zone and for withdrawing such diverted gases from the tank through a path separate and distinct from the path of withdrawal of the main body of gases from the tank.

4. Apparatus for making glass, comprising a tank for containing a bath of molten glass, means for supplying heat to said tank by combustion in such manner that the products of combustion will traverse the tank in a predetermined path, means for recovering a portion of the heat of the main body of combustion products discharged from the tank to preheat the air supplied thereto for combustion, means for supplying glass making materials to a zone of said tank out of said predetermined path, and means for diverting a portion of the products of combustion from the main stream flowing in said path across said zone and for withdrawing such diverted gases from the tank through a path by-passing said heat recovery means and separate and distinct from the path of withdrawal of the main body of gases from the tank.

5. Apparatus for making glass, comprising a tank for containing a bath of molten glass, means for supplying heat to said tank by combustion in such manner that the products of combustion will traverse the tank in a predetermined path, a bay formed on the tank out of said path and extending down below the normal level of the bath of the glass in the tank, means for supplying glass making materials to the bath of glass in said bay, and means for diverting a portion of the products of combustion from the stream flowing in said path across said bay and the glass making materials supplied thereto at a relatively low velocity as compared to the velocity of flow of the gases in the main stream and for withdrawing such diverted gases from the tank through a path separate and distinct from the path of withdrawal of the main stream of gases from the tank.

6. Apparatus for making glass, comprising a tank for containing a bath of molten glass, means for supplying heat to said tank by combustion in such manner that the products of combustion will traverse the tank in a predetermined path, a bay formed on the tank out of said path and extending down below the normal level of the bath of glass in the tank, means for supplying glass making materials to the bath of glass in said bay, means connected with said bay for conducting from the tank a portion of the gases of combustion diverted from the main stream thereof flowing in said path as aforesaid to supply heat to frit over and partially melt the glass making materials in said bay and to conduct away any solid matter picked up by such diverted gases in a path separate and distinct from that taken by the main body of the gases on leaving the tank, and means for adjustably controlling the amount of gases diverted as aforesaid.

7. Apparatus for making glass, comprising a tank for containing a bath of molten glass, means for supplying heat to said tank by combustion in such manner that the products of combustion will traverse the tank in a predetermined path, regenerators associated with the tank for recovering a portion of the heat of the main body of the outgoing gases, means including flues, a stack and a reversing valve system for conducting the exhaust gases from the regenerators to a discharge point, a bay formed on the tank out of said path and extending down below the normal level of the bath of glass in the tank, means for supplying glass making materials to the bath of glass in said bay, and passage means communicating between said bay and said stack and by-passing said regenerators and said reversing valve system for conducting from the tank a portion of the gases of combustion diverted from the main stream thereof flowing in said path as aforesaid to supply heat to frit over and partially melt the glass making materials in said bay and to prevent corrosion and clogging of the regenerators and of the reversing valve system by solid matter picked up by the diverted gases in passing over the newly supplied glass making materials in said bay.

8. Apparatus for making glass, comprising a tank for containing a bath of molten glass, means for supplying heat by combustion to the tank including regenerators arranged at the lateral sides of the tank and having ports communicating with the flame space thereof to cause a periodically reversed flow of products of combustion across the tank transversely thereof, a reversing valve system and a stack communicating with said regenerators, a bay formed centrally of one end of the tank out of the path of the products of combustion as aforesaid and extending downwardly to a level below the normal level of the bath of glass in the tank, means for supplying glass making materials to the bath of glass in said bay, symmetrically disposed passages communicating between the lateral sides of said bay adjacent to the point at which the glass making materials are introduced thereto and the stack to conduct directly to the stack gases diverted from the main body flowing in said tank as aforesaid in paths passing over the newly introduced glass making materials in said bay and by-passing said regenerators and said reversing valve system for fritting over and partially melting the glass making materials while preventing corrosion and clogging of the regenerators by solid material picked up by the diverted gases, and valve means for adjustably and independently controlling the flow of gases in each of the passages which communicate with said bay.

GEORGE E. HOWARD.